United States Patent
Rekimoto

(10) Patent No.: US 9,625,722 B2
(45) Date of Patent: Apr. 18, 2017

(54) CONTROL DEVICE, DISPLAY DEVICE, CONTROL METHOD, ILLUMINATION CONTROL METHOD, AND PROGRAM

(71) Applicant: SONY CORPORATION, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 307 days.

(21) Appl. No.: 13/895,618

(22) Filed: May 16, 2013

(65) Prior Publication Data

US 2013/0335461 A1 Dec. 19, 2013

(30) Foreign Application Priority Data

Jun. 14, 2012 (JP) .................................. 2012-134678

(51) Int. Cl.
G02B 27/01 (2006.01)

(52) U.S. Cl.
CPC ....... *G02B 27/0172* (2013.01); *G02B 27/017* (2013.01); *G02B 2027/014* (2013.01); *G02B 2027/0112* (2013.01); *G02B 2027/0118* (2013.01)

(58) Field of Classification Search
CPC .... G02B 2027/0112; G02B 2027/0118; G02B 2027/014; G02B 27/017; G02B 27/0172; G01C 23/005
See application file for complete search history.

(56) References Cited

U.S. PATENT DOCUMENTS

| 2002/0163521 A1* | 11/2002 | Ellenby | G01C 17/34 |
| | | | 345/502 |
| 2008/0088646 A1* | 4/2008 | Sako | H04N 13/044 |
| | | | 345/647 |
| 2008/0088936 A1* | 4/2008 | Tang et al. | 359/630 |
| 2009/0303082 A1* | 12/2009 | Larson | G01C 23/005 |
| | | | 340/945 |
| 2010/0247061 A1* | 9/2010 | Bennett | G06F 17/30056 |
| | | | 386/247 |
| 2012/0134543 A1* | 5/2012 | Fedorovskaya et al. | 382/107 |
| 2013/0235234 A1* | 9/2013 | Cucci | H04N 5/23206 |
| | | | 348/231.99 |

FOREIGN PATENT DOCUMENTS

| JP | H05-328258 A | 12/1993 |
| JP | 2008-076767 A | 4/2008 |

* cited by examiner

*Primary Examiner* — Nicholas Lee
*Assistant Examiner* — Richard Hong
(74) *Attorney, Agent, or Firm* — Chip Law Group

(57) ABSTRACT

There is provided a control device including an illumination control unit that controls an illumination device illuminating a non-display region of a light-shielding unit that includes a display region in which an image is displayed and the non-display region in which the image is not displayed and is designed to be disposed in a region covering a visual field of a user. The illumination control unit controls the illumination device according to display content of the display region.

20 Claims, 14 Drawing Sheets

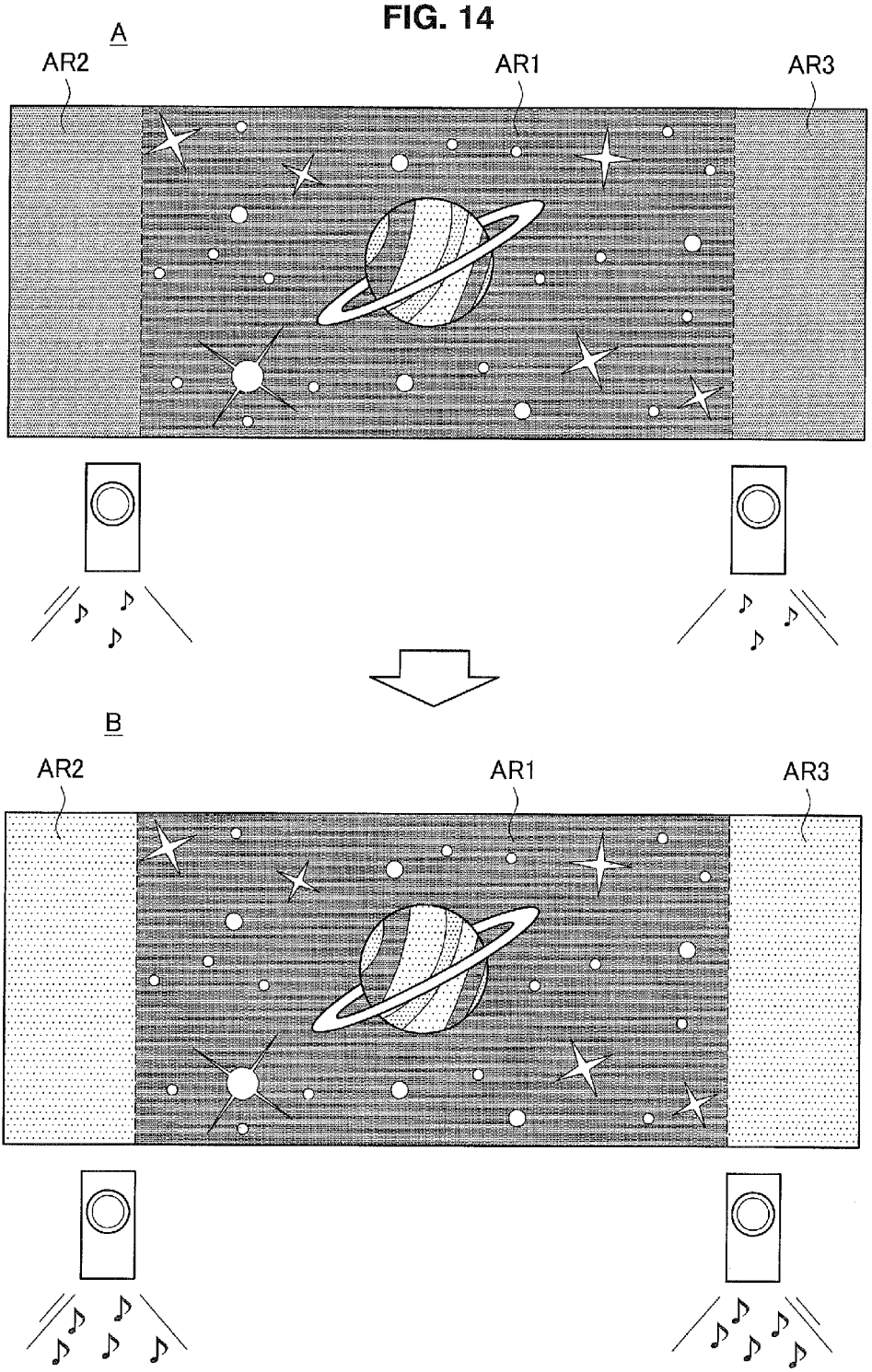

CONTROL DEVICE, DISPLAY DEVICE, CONTROL METHOD, ILLUMINATION CONTROL METHOD, AND PROGRAM

BACKGROUND

The present disclosure relates to a control device, a display device, a control method, an illumination control method, and a program.

In recent years, technologies for automatically adjusting luminance of a display region according to the luminance of the periphery of a display have been suggested to reduce fatigue on the eyes caused due to long-time viewing of a screen of the display.

For example, Japanese Unexamined Patent Application Publication No. 2008-76767 discloses a technology for detecting the luminance of environmental light and automatically adjusting the detected luminance of a display region of a display according to the luminance of the environmental light.

Further, for example, Japanese Unexamined Patent Application Publication No. H05-328258 relates to a head-mounted display (HMD) of a type that completely shields an outside visual field and discloses a technology for causing the outer circumference of an image to be gradually unclear so that a boundary (image frame) between a display region in which a video is displayed and a non-display region is rarely noticed.

SUMMARY

The technology disclosed in Japanese Unexamined Patent Application Publication No. 2008-76767 is not a technology for automatically adjusting the luminance of the periphery of a display. Therefore, since a luminance difference occurs between the inside of the screen of the display and the periphery of the display, the fatigue on the eyes may not be efficiently relieved.

Further, the technology disclosed in Japanese Unexamined Patent Application Publication No. H05-328258 is a technology for performing control such that the luminance of the display region is gradually reduced along the outer circumference and is not a technology for illuminating a region outside the display region. Therefore, the luminance difference between the display region and the region outside the display region may not be said to be sufficiently reduced.

It is desirable to provide a novel and improved control device, a novel and improved display device, a novel and improved control method, a novel and improved illumination control method, and a novel and improved program capable of efficiently relieving the fatigue on the eyes caused due to a luminance difference between a display region in which an image is displayed and a non-display region in which the image is not displayed.

According to an embodiment of the present disclosure, there is provided a control device including an illumination control unit that controls an illumination device illuminating a non-display region of a light-shielding unit that includes a display region in which an image is displayed and the non-display region in which the image is not displayed and is designed to be disposed in a region covering a visual field of a user. The illumination control unit may control the illumination device according to display content of the display region.

According to an embodiment of the present disclosure, there is provided an environmental light detection unit that detects environmental light of an external environment exposed from a surface of the light-shielding unit located opposite a surface including the display region and the non-display region. The illumination control unit may control the illumination according to the environmental light.

According to an embodiment of the present disclosure, there is provided a control method including controlling an illumination device that, according to display content of a display region, illuminates a non-display region of a light-shielding unit that includes the display region in which an image is displayed and the non-display region in which the image is not displayed and is designed to be disposed in a region covering a visual field of a user.

According to an embodiment of the present disclosure, there is provided a program for causing a computer to realize an illumination control function of controlling an illumination device illuminating a non-display region of a light-shielding unit that includes a display region in which an image is displayed and the non-display region in which the image is not displayed and is designed to be disposed in a region covering a visual field of a user. The illumination control function may control the illumination device according to display content of the display region.

According to an embodiment of the present disclosure, there is provided an illumination control method including controlling illumination to a non-display region located in a periphery of a display region according to information on an image displayed in the display region when the non-display region is illuminated by displaying the image in the display region in a light-shielding unit that includes the display region in which the image is displayed and the non-display region in which the image is not displayed and is designed to be disposed in a region covering a visual field of a user.

According to an embodiment of the present disclosure, there is provided a program for causing a computer to realize an image display function of displaying an image in a display region in a light-shielding unit that includes the display region in which the image is displayed and a non-display region in which the image is not displayed and is designed to be disposed in a region covering a visual field of a user; and an illumination control function of controlling the illumination to the non-display region located in a periphery of the display region by controlling an illumination unit illuminating the non-display region.

According to the embodiments of the present disclosure, it is possible to efficiently relieve the fatigue on the eyes caused due to a luminance difference between a display region in which an image is displayed and a region outside the display region in which the image is not displayed.

BRIEF DESCRIPTION OF THE DRAWINGS

FIGS. 14A and 14B are diagrams illustrating the illumination control according to a rhythm of music corresponding to an image.

DETAILED DESCRIPTION OF THE EMBODIMENTS

Figure 1:
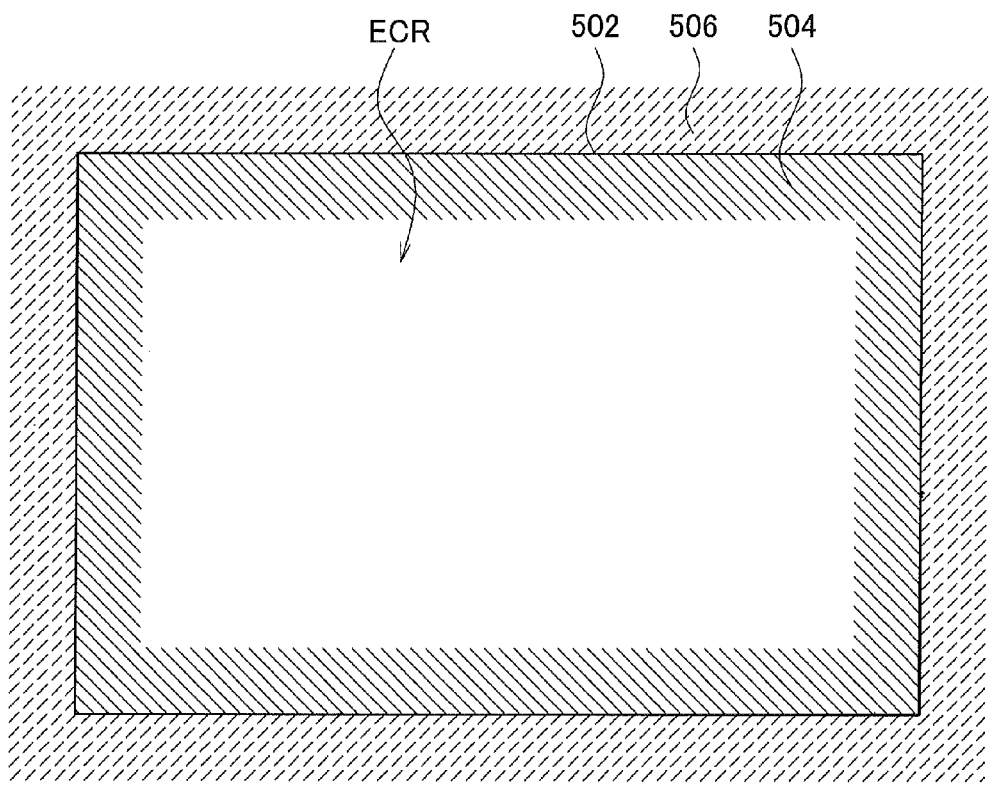
FIG. 1 is a diagram for describing terms used in an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Different numbers or letters are appended to a plurality of constituent elements having substantially the same or related functions in some of the embodiments of the present disclosure and the drawings to distinguish the constituent elements from each other or different numbers or letters are suffixed to the same numerals via hyphen or underscore to distinguish the constituent elements from each other in some cases.

However, when it is not necessary to distinguish the plurality of constituent elements having substantially the same or related functions from each other in others of the embodiment of the present disclosure and the drawings, the same reference numerals are given in some cases.

The description will be made in the following order:
1: Introduction (FIG. 1)
2. Basic configuration
2-1: Outer appearance of display device 100 (FIGS. 2 and 3)
2-2: Functional configuration of control device 150 (FIG. 4)
2-2-1: Illumination control based on average luminance of image (FIG. 5)
2-2-2: Illumination control based on partial region of image (FIG. 6)
2-2-3: Illumination control based on peripheral region of image (FIG. 7)
2-3: Flow of process performed by control device 150 (FIG. 8)
3. Modification examples
3-1: Illumination control based on external environment (FIG. 9)
3-2: Control based on meta information on image
3-2-1: Control based on imaging condition of image
3-2-2: Control based on flag of image (FIGS. 10A and 10B)
3-3: Control of luminance and color of image based on luminance and color of illumination unit (FIGS. 11 to 13)
3-4: Illumination control based on rhythm
3-4-1: Illumination control with predetermined rhythm
3-5: Combination examples
3-5-1: Illumination control based on image and external environment
3-5-2: Illumination control based on image and rhythm (FIGS. 14A and 14B)
4: Summarization (Overview)

In the basic configuration of the outline above, a configuration in which illumination control of a non-display region (in an embodiment of the present disclosure, referred to as an illumination region) of a display device 100 is performed based on an image (in the embodiment of the present disclosure, simply referred to as an image) displayed in a display region of the display device 100 will be described.

In the modification examples of the outline above, a configuration in which the illumination control of the illumination region of the display device 100 is performed based on an external environment of the display device 100 in addition to an image will be described. Further, a configuration in which the illumination control is performed based on a rhythm will be described. Furthermore, combinations of the configurations and the basic configuration will be described.

1: Introduction (FIG. 1)

Before the display device 100 and a control device 150 according to the embodiment are described, a term "edge portion" used in the embodiment of the present disclosure will be described with reference to FIG. 1.

FIG. 1 is a diagram for describing terms used in an embodiment of the present disclosure. In the following description, as illustrated in FIG. 1, a closure region ECR which is defined by any boundary 502 and is a closed region and a region other than the closure region ECR will be focused on.

In general, the term "edge portion" is a concept including "a region 504 of the periphery of the boundary 502 in the closure region ECR closed by the predetermined boundary 502" and "a region 506 in the periphery of the boundary of the boundary 502 in a region other than the closure region ECR," as illustrated in FIG. 1.

Accordingly, in the embodiment of the present disclosure, to distinguish "the region 504 in the periphery of the boundary 502 in the closure region ECR closed by the predetermined boundary 502" and "the region 506 in the periphery of the boundary 502 in the region other than the closure region ECR," as illustrated in FIG. 1, from each other, "the region 504 in the periphery of the boundary 502 in the closure region ECR closed by the predetermined boundary 502" is referred to as an "edge portion of the closure region ECR." On the other hand, "the region 506 in the periphery of the boundary 502 in the region other than the closure region ECR" is referred to as an "edge portion of the region other than the closure region ECR."

For example, when the "closure region ECR" is a "display region," "the region 504 in the periphery of the boundary 502 in the display region" is referred to as an "edge portion of the display region."

For example, when the "region other than the closure region ECR" is an "illumination region," "the region 506 in the periphery of the boundary 502 in the illumination region" is referred to as an "edge portion of the illumination region."

The following description will be made using the above-described terms.

2. Basic Configuration

[2-1: Outer Appearance of Display Device 100 (FIGS. 2 and 3)]

Figure 2:
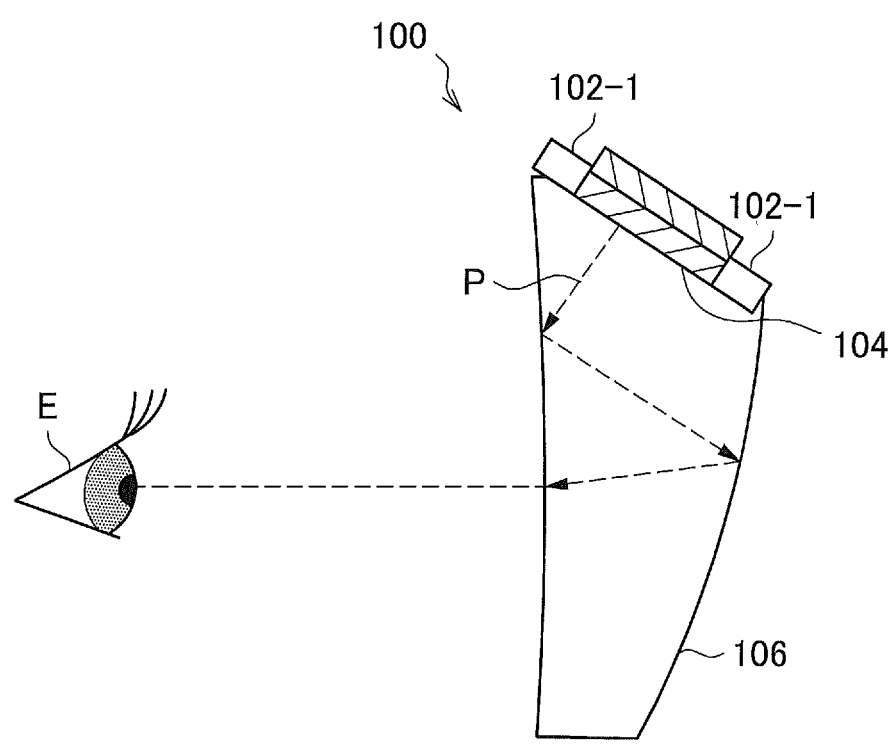
FIG. 2 is an external view illustrating a first example of a display device according to the embodiment.
Figure 3:
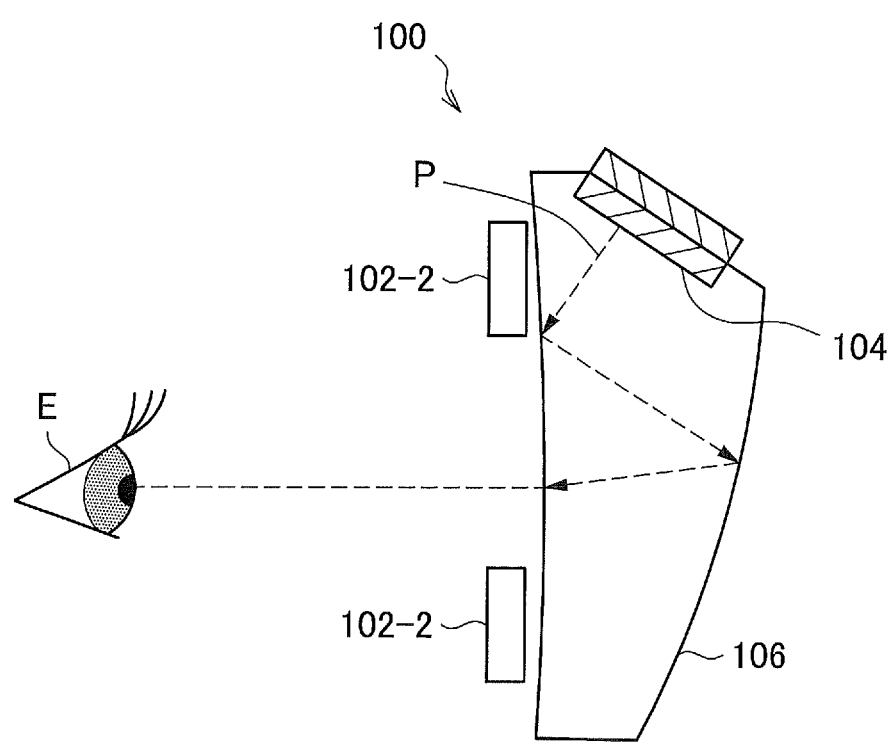
FIG. 3 is an external view illustrating a second example of the display device according to the embodiment.

Hereinafter, the display device 100 according to the embodiment will be described with reference to FIGS. 2 and 3. The display device 100 is controlled by the control device 150. FIGS. 2 and 3 are external views illustrating examples of the display device 100. FIGS. 2 and 3 schematically illustrate a cross section when the display device 100 is cut away in a direction substantially parallel to a line of sight of a user.

Here, the display device illustrated in FIGS. 2 and 3 is an example of the display device 100. The positions of some of the constituent elements may be changed, and some of the constituent elements may be added, deleted, or modified. The display device 100 will be described below as a non-transmissive type HMD in which light external to the HMD does not transmit through to the inside of the HMD. However, a transmissive HMD in which light external to the HMD or a part of the external light transmits through to the inside of the HMD or a display other than a head-mounted display may be used.

A technology relevant to the embodiment of the present disclosure may be applied even to a device in which the display device 100 and the control device 150 are integrated. The control device 150 may be a server or the like which the display device 100 can access. The control device 150 according to the embodiment may be integrated with a device subordinate to the display device 100.

FIGS. 2 and 3 illustrate the configurations in which an image is displayed to one eye of the user in the display device 100. In the actual HMD, the configuration illustrated in FIG. 2 or 3 is installed to correspond to each of the right and left eyes of the user.

As illustrated in FIGS. 2 and 3, the display device 100 includes an illumination unit 102, an image display unit 104, and a lens 106. As illustrated in FIGS. 2 and 3, the display device 100 may include a plurality of illumination units 102 or may include one illumination unit 102. The display device 100 further includes a light-shielding unit (not illustrated) that shields light from the external environment by covering the illumination unit 102, the image display unit 104, the lens 106, and the like when the display device 100 is mounted on the periphery of the eyes of the user.

The function of the illumination unit 102 is realized by a light-emitting element such as a light-emitting diode (LED). The function of the illumination unit 102 can be also realized by a combination of a light-emitting element and a light-shielding element that shields light from the light-emitting element.

The function of the image display unit 104 is realized by, for example, a liquid crystal display device or an organic electro-luminescence (EL) display device. Further, a part of the liquid crystal display device, the organic EL display, or the like may be used as the illumination unit 102.

A design or a material of an appropriate shape of the lens 106 is selected according to the positions of the above-described image display unit 104 and the eye of the user. Light from the image display unit 104 may be reflected from the boundary surface of the lens 106 once or a plurality of times and arrive at an eye E of the user.

As illustrated in FIGS. 2 and 3, the light from the image display unit 104 is incident on the eye E of the user via the lens 106. A light path P in FIGS. 2 and 3 indicates an example of a path until the light arrives from the image display unit 104 to the eye E of the user.

Here, a region in which the user can clearly recognize an image is a part of the visual field of the user. Therefore, in regard to the display device such as an HMD, the display device 100 is designed so that a virtual image from the image display unit 104 is formed in the region in which the user can clearly recognize an image.

In the embodiment of the present disclosure, a region in which the virtual image from the image display unit 104 is formed is referred to as a display region.

On the other hand, since an image is not displayed in a non-display region, the non-display region generally has a black frame shape. Therefore, a luminance difference between the display region and the peripheral region of the display region is a cause of fatigue on the eyes of the user.

Accordingly, a technology for reducing the luminance difference between the display region and the non-display region by adjusting the luminance of the non-display region with irradiated light from the illumination unit 102 will be described in the embodiment of the present disclosure.

The display device 100 according to the embodiment of the present disclosure adjusts the luminance of the irradiated light from the illumination unit 102 based on the luminance of an image displayed on the image display unit 104.

The irradiated light from the illumination unit 102 is also incident on the eyes of the user via the lens 106. However, since the luminance of the non-display region is high, a portion close to the non-display region may be bright in the display region in some cases.

Therefore, the light path P from the image display unit 104 is preferably designed to be different from a light path from the illumination unit 102.

For example, as in illumination units 102-1 in FIG. 2, the illumination units 102 can be considered to be disposed in the opposite side surfaces in the side surfaces of the image display unit 104.

For example, as in illumination units 102-2 in FIG. 3, the illumination units 102 can be considered to be disposed at positions which are not superimposed on a surface, which the user faces and is a display region in which an image is displayed in view from the user, in a surface of the lens 106.

When the illumination units 102 are disposed in this way, visibility of an image displayed in the display region for the user can be prevented from deteriorating and a region other than the display region can effectively be illuminated.

The configurations of the display device 100 controlled by the control device 150 have been described above with reference to FIGS. 2 and 3.

[2-2: Functional Configuration of Control Device 150 (FIG. 4)]

Figure 4:
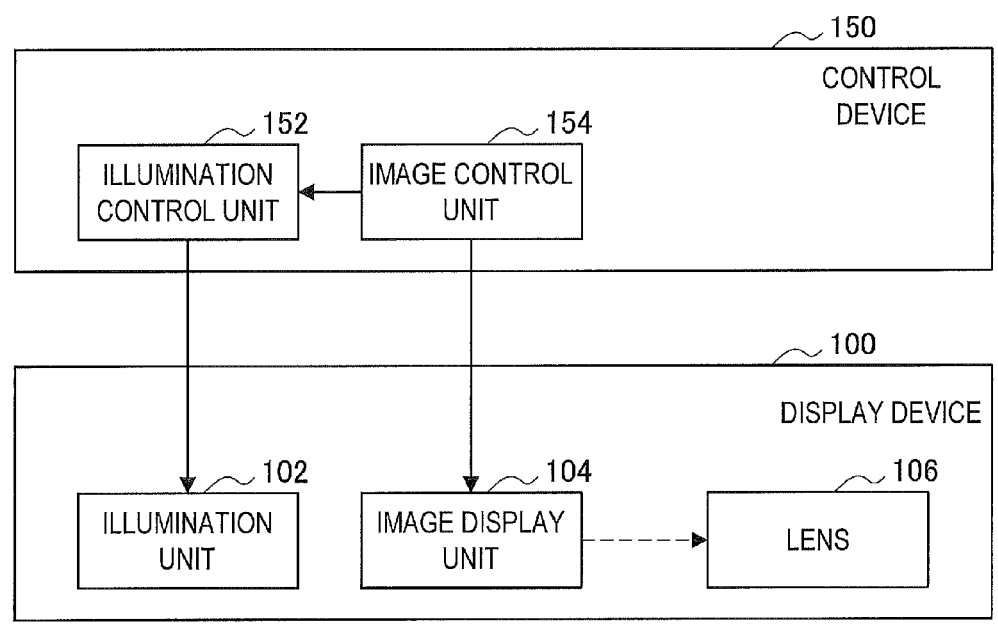
FIG. 4 is a block diagram illustrating functional configurations of the display device and a control device according to the embodiment.

Hereinafter, functional configurations of the display device 100 and the control device 150 will be described with reference to FIG. 4. In FIG. 4, a solid line indicates the flow of an electric signal and a dotted line indicates light emission from the image display unit 104. Further, in FIGS. 9 and 11, the kinds of lines are assumed to have the same meanings.

The display device 100 includes the illumination unit 102, the image display unit 104, and the lens 106, as described above. The control device 150 includes an illumination control unit 152 and an image control unit 154.

An image signal is input from the image control unit 154 to the illumination control unit 152 of the control device 150. Examples of the image signal include a luminance signal of each pixel of an image and a color signal expressed by a set of an R signal value, a G signal value, and a B signal value.

The illumination control unit 152 of the control device 150 adjusts the luminance or color of the illumination unit 102 of the display device 100 based on input image information. A more specific control method will be described below. The input image may be a still image or a moving image. Further, the input image may be a two-dimensional image or a stereoscopic image (three-dimensional image).

The image control unit 154 of the control device 150 controls the image display unit 104 of the display device 100.

Light from the image display unit 104 of the display device 100 is incident on the eye E of the user via the lens 106. As in the example illustrated in FIG. 2, the light from the illumination unit 102 of the display device 100 can be considered to be incident on the eye E of the user via the lens 106.

The functional configurations of the display device 100 and the control device 150 have been described above with reference to FIG. 4.

Hereinafter, an example of a control method performed by the illumination control unit 152 of the control device 150 will be described with reference to FIGS. 5 to 7. The luminance of an image will mainly be described below, but the control can be considered to be likewise performed even on a color.

The illumination control unit 152 may perform one of luminance control of the illumination region based on the luminance of the display region and the color control of the illumination region based on the color of the display region or may perform both the luminance control and the color control.

(2-2-1: Illumination Control Based on Average Luminance of Image (FIG. 5))

Figure 5:
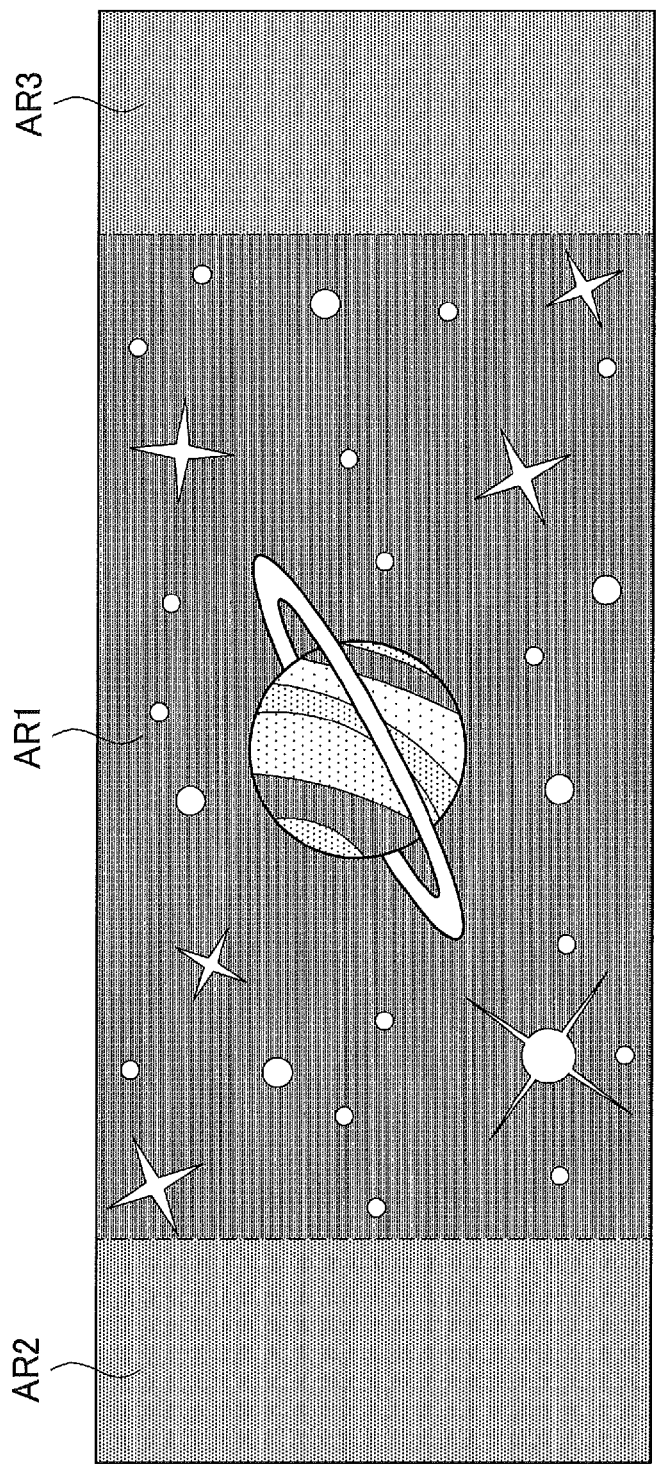
FIG. 5 is a diagram illustrating illumination control based on average luminance of an image.

FIG. 5 is a diagram illustrating illumination control based on average luminance of an image. A display region AR1 of the display device 100, an image with low average luminance of the entire region, such as an outdoor nighttime image or an image of outer space, is displayed.

A non-display region is, for example, a region that comes into contact with an edge portion of the display region AR1 in view from a user. The non-display region is, for example, a region (AR2 in FIG. 5) that comes into contact with the left edge portion of the display region AR1 or a region (AR3 in FIG. 5) that comes into contact with the right edge portion of the display region AR1.

For example, the illumination control unit 152 of the control device 150 adjusts the luminance of the non-display regions (in the embodiment of the present disclosure, also referred to as illumination regions) AR2 and AR3 based on average luminance of an image displayed in the display region AR1.

For example, the illumination control unit 152 performs illumination control so that the luminance of the illumination regions AR2 and AR3 is the average luminance of the image displayed in the display region AR1. The illumination control unit 152 may illuminate each of the illumination regions AR2 and AR3 independently.

As described above, by adjusting the non-display region to have the average luminance of the image, it is possible to obtain the advantage of reducing the fatigue on the eyes while reflecting an impression of the entire image.

Here, when the image input to the control device 150 is a stereoscopic image, it is known that the boundary between the display region and the non-display region may become a step difference such as a frame (frame effect). For this reason, as described above, the advantage of reducing the fatigue on the eyes by reducing the luminance difference between the display region and the non-display region is particularly considerable when a stereoscopic image is input to the control device 150.

(2-2-2: Illumination Control Based on Partial Region of Image (FIG. 6))

Figure 6:
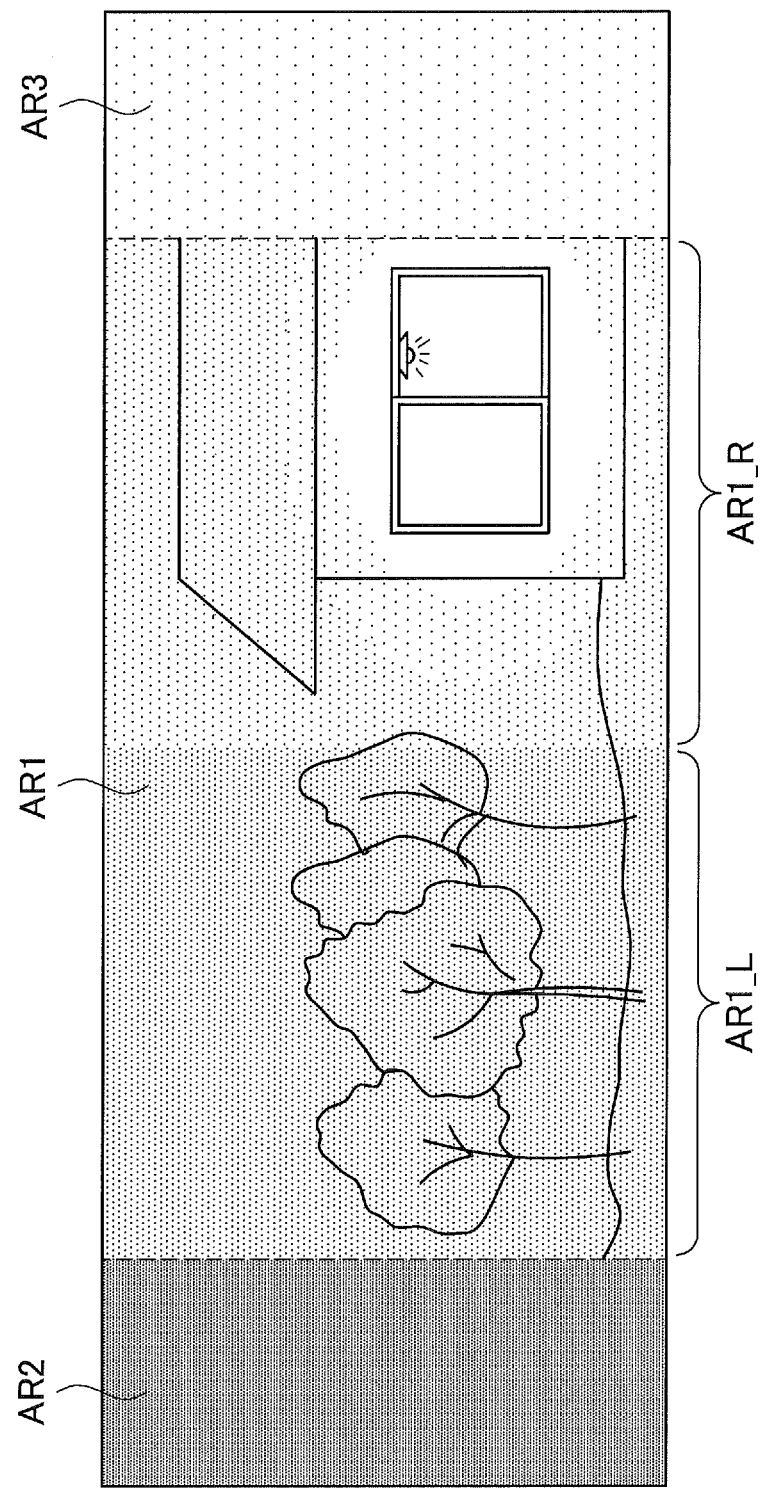
FIG. 6 is a diagram illustrating illumination control based on luminance of a part of the image.

FIG. 6 is a diagram illustrating illumination control based on a partial region of an image. The basic concept is the same as that of the method illustrated in FIG. 5 described above.

The illumination control method illustrated in FIG. 6 is an effective method when the luminance of a region in which an image is present is low and the luminance of the other region is high.

When an image in which a bias of the luminance is large inside the image is displayed in the display region, a method of determining the luminance of the illumination region based on the average luminance of the entire display region can be preferentially considered, as in the illumination control method illustrated in FIG. 5. In this case, in the boundary between the display region and the illumination region, the luminance difference is small near a given boundary. However, the luminance difference is considered to be large near the other boundary.

Accordingly, when the plurality of illumination regions are present, the illumination control unit 152 is considered to adjust the luminance of the illumination regions based on the luminance of each display region close to each illumination region.

For example, when the plurality of illumination regions are present, the illumination control unit 152 is considered to adjust the luminance of each illumination region based on average luminance of the pixels constituting the display region close to each illumination region.

As illustrated in FIG. 6, for example, the luminance of an illumination region AR2 which is a region in the periphery of a display region AR1 is controlled based on the luminance of a region (a region AR1_L in FIG. 6) that comes into contact with the illumination region AR2 in the display region AR1.

The luminance of an illumination region AR3 which is a region in the periphery of the display region AR1 and is a region different from the above-described illumination region AR2 is controlled based on the luminance of a region (a region AR1_R in FIG. 6) that comes into contact with the illumination region AR3 in the display region AR1.

As described above, by dividing the display region and controlling each illumination unit 102 based on the luminance of each of the divided regions, it is possible to further reduce the luminance difference between the display region in which the image is displayed and the other regions.

In the example illustrated in FIG. 6, the display region is divided into two regions and the control is performed based on the luminance of each of the divided regions. However, the technical application range according to the embodiment is not limited thereto. Even when the display region is divided into three or more regions, the control can be performed in the same way.

As a result, it is possible to reduce the fatigue on the eyes of the user.

(2-2-3: Illumination Control Based on Peripheral Region of Image (FIG. 7))

Figure 7:
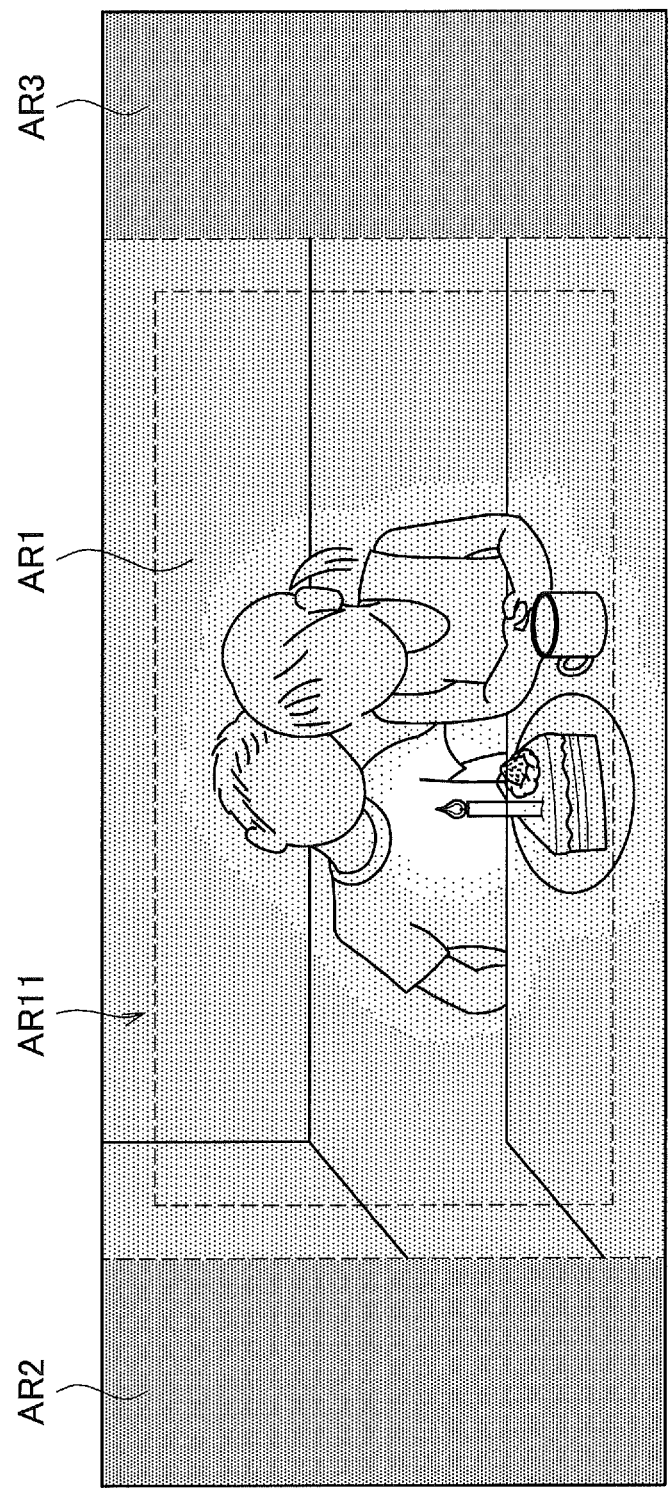
FIG. 7 is a diagram illustrating the illumination control based on luminance of an edge portion of the image.

FIG. 7 is a diagram illustrating illumination control based on a peripheral region of an image. FIG. 7 illustrates an example in which luminance of illumination regions AR2 and AR3 is controlled based on the luminance of an edge portion AR11 of a display region AR1.

As illustrated in FIG. 7, the illumination control unit 152 can be considered to perform illumination control on the illumination unit 102 so that the luminance of a non-display region is adjusted based on the luminance (for example, an average luminance of the pixels included in an image displayed in the edge portion of the display region AR1) of the edge portion of the display region AR1.

As described above, by adjusting the illumination irradiated to the non-display region based on the luminance of the edge portion of the display region, it is possible to perform effect illumination control specialized for the vicinity of a boundary in which a luminance difference between the display region and the other regions is easily noticeable.

For example, in the example illustrated in FIG. 7, average luminance of the entire display region AR1 is higher than average luminance of the edge portion of the display region AR1. Accordingly, when the illumination control of the illumination regions AR2 and AR3 is performed based on the average luminance of the entire display region AR1, the luminance difference near the boundary between the edge portion of the display region AR1 and the edge portion of the illumination region AR2 or the like may be increased.

On the other hand, when the illumination control of the illumination regions AR2 and AR3 is performed based on the luminance of the edge portion of the display region AR1, the luminance difference near the boundary between the edge portion of the display region AR1 and the edge portion of the illumination region AR2 or the like can be decreased.

The examples of the control method performed by the illumination control unit 152 of the control device 150 have been described above with reference to FIGS. 5 to 7.

[2-3: Flow of Process Performed by Control Device 150 (FIG. 8)]

Figure 8:
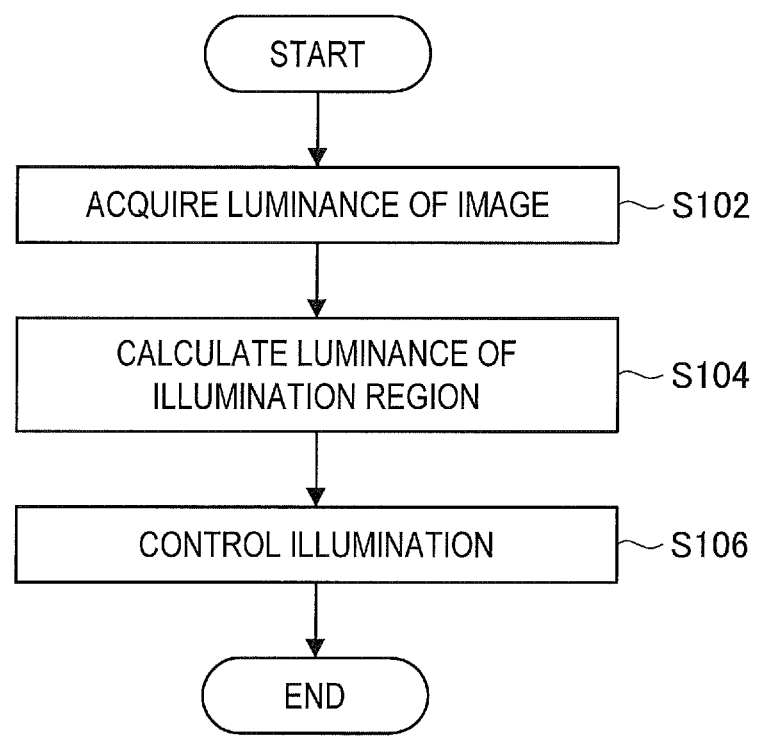
FIG. 8 is a flowchart illustrating an example of the flow of a process performed by the control device according to the embodiment.

Hereinafter, an overview of the flow of a process performed by the control device 150 will be described with reference to FIG. 8. FIG. 8 is a flowchart illustrating an example of the flow of the process performed by the control device 150.

As illustrated in FIG. 8, the illumination control unit 152 first acquires the luminance of each pixel included in a part or the entirety of an image from the image control unit 154 (S102). Here, the image refers to an image that is displayed in a display region of the display device 100 to be controlled by the control device 150.

For example, as in the example illustrated in FIG. 7, when the illumination control unit 152 performs the illumination control only based on the luminance of a partial region such as an edge portion of an image, only the luminance of a region necessary for the process may be acquired. As a result, since a processing load of the control device 150 is reduced, the process can be performed at a high speed.

Next, the illumination control unit 152 calculates the luminance of the illumination region illuminated by the illumination unit 102 of the display device 100 based on the acquired luminance (S104). For example, the illumination control unit 152 adjusts the luminance of a region other than the display region according to the average luminance of the display region in which the image is displayed.

Next, the illumination control unit 152 performs the illumination control of the illumination unit 102 so that the luminance of the illumination region is the calculated luminance (S106).

The overview of the flow of the process performed by the control device 150 has been described with reference to FIG. 8. FIG. 8 is merely an example and some processing steps may be added or modified.

The basic configuration of the display device 100 has been described above with reference to FIGS. 2 to 8.

3. Modification Examples

The basic configuration of the embodiment has been described above, but the technical application range according to the embodiment is not limited thereto. For example, modification examples conceivable in consideration of technical common knowledge at the time of implementation exemplified below are, of course, also included in the technical application range of the technology according to the embodiment.

[3-1: Illumination Control Based on External Environment (FIG. 9)]

Hereinafter, a modification example in which control of the illumination region is performed based on an external environment in addition to the luminance of an image in consideration of the above-described basic configuration will be described with reference to FIG. 9.

Figure 9:
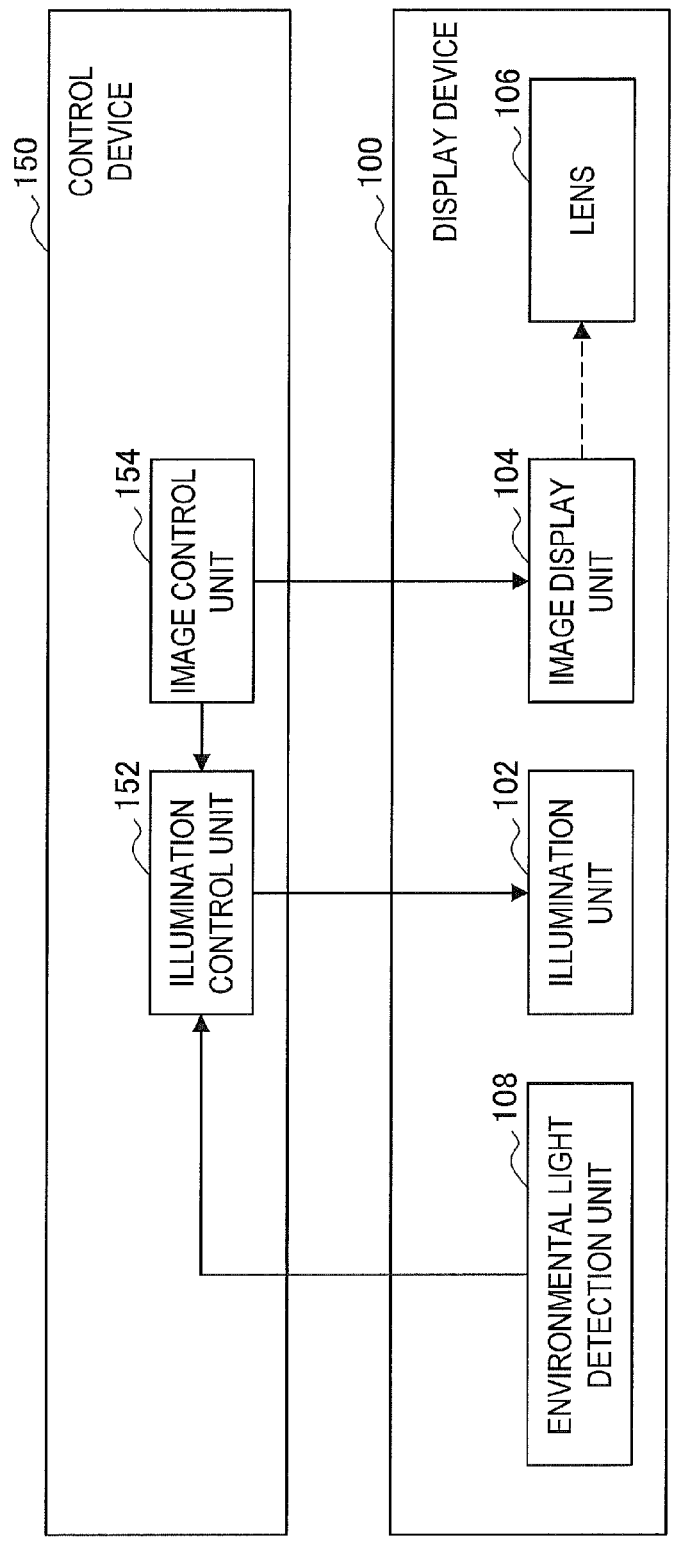
FIG. 9 is a block diagram illustrating functional configurations of a display device and a control device according to a modification example of the embodiment.

FIG. 9 is a block diagram illustrating a functional configuration of a display device 100 according to the modification example. A configuration in which control of the illumination region is performed based on environmental light in the external environment will be described below.

For example, as illustrated in FIG. 9, an illumination control unit 152 of the control device 150 according to the modification example performs illumination control of an illumination unit 102 of the display device 100 based on the luminance of environmental light input from an environmental light detection unit 108 of the display device 100 and an image control unit 154.

For example, the environmental light detection unit 108 of the display device 100 is disposed in a portion coming into contact with the external environment or is disposed in a portion of a space in which the display device 100 is installed in an HMD.

In the case of the HMD, the external environment is, for example, an environment outside of a light-shielding unit. In other words, for example, the external environment is an environment which may not be recognized by a user when wearing a non-transmissive HMD, but which may be recognized by the user when removing the non-transmissive HMD from his or her head.

When a display other than the HMD is used, for example, not only a space (for example, a room or the like in which the display is installed) in which the display is installed but also the outside (for example, the outside or the like of the room in which the display is installed) of the space can be considered to be the external environment and the intensity of the environmental light can be detected.

By using the environmental light in the control of the luminance of the illumination region, the brightness of the environment recognized by the user is not abruptly changed when the user wears or removes the HMD or the like or the user exits the room in which the display is installed. Therefore, it is possible to reduce a burden on the eyes of the user.

The luminance of the illumination region can be controlled in consideration of elements of the external environment such as temperature, humidity, and weather other than the environmental light. The luminance of the illumination region can be controlled according to a period of time.

The illumination control in consideration of the external environment has been described with reference to FIG. 9.

[3-2: Control Based on Meta Information on Image]

Hereinafter, a modification example in which control of the luminance of an illumination region is performed based on meta data added to an image will be described with reference to FIGS. 10A and 10B.

(3-2-1: Control Based on Imaging Condition of Image)

An illumination control unit 152 can control an illumination unit 102 based on information regarding imaging conditions such as a kind of digital camera, an imaging date, and an exposure condition added when an image is captured in the digital camera.

(3-2-2: Control Based on Flag of Image (FIGS. 10A and 10B))

The information added to an image is not limited to the information regarding the above-described imaging conditions. The illumination control unit 152 may perform illumination control of the illumination unit 102 based on, for example, meta information such as a flag added in advance to a predetermined scene as a dramatic effect of a moving image such as a movie.

Even when the flag added to the predetermined scene is not assigned in advance by a moving image producer or the like, the illumination control unit 152 may perform the illumination control of the illumination unit 102 based on information acquirable through analysis of a moving image or the like, such as presence or absence of a predetermined scene or a time at which a predetermined scene is displayed.

Figure 10:
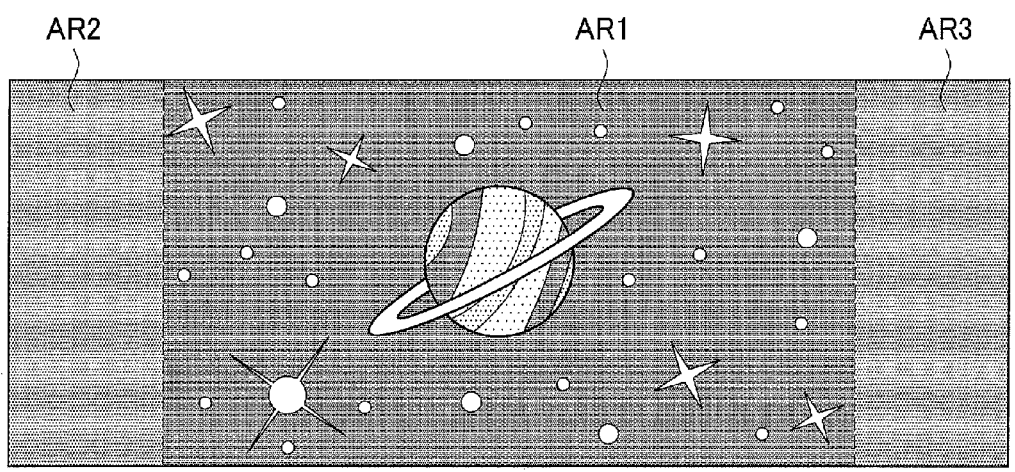
FIGS. 10A and 10B are diagrams illustrating illumination control based on meta information of an image.
Figure 10:
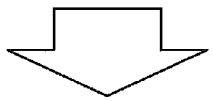
Figure 10:
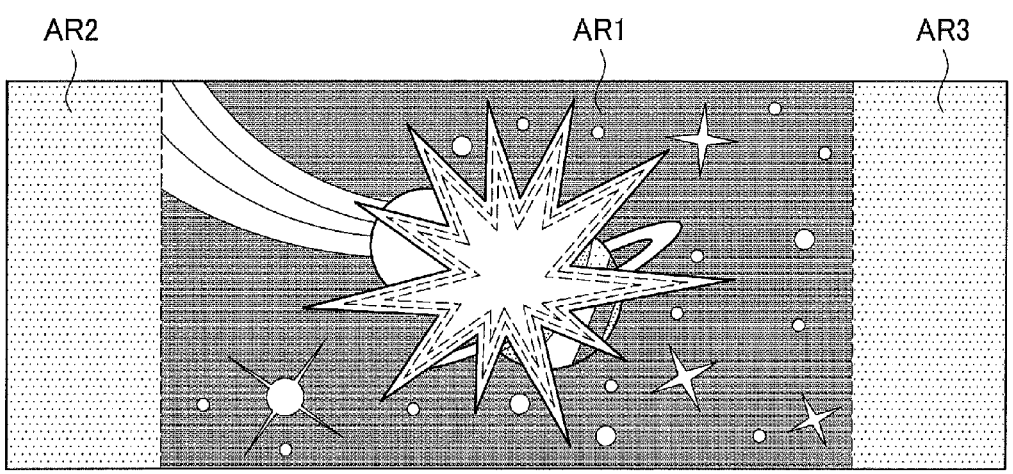

For example, an example illustrated in FIGS. 10A and 10B can be considered as the control based on the flag or the like of an image. FIGS. 10A and 10B are diagrams illustrating the illumination control based on the meta information on an image.

As illustrated in FIGS. 10A and 10B, in a case of a moving image in which a scene is shifted from a normal scene (FIG. 10A) to an explosion scene (FIG. 10B), the luminance of illumination regions AR2 and AR3 is set to be considerably higher than the average luminance or the like of a display region AR1 when the explosion scene (FIG. 10B) starts, and thus viewers can be considered to be startled.

The illumination control based on the meta information on the image described above can improve the dramatic effect, thereby causing the user to be further immersed in the image.

The illumination control based on the meta information on the image has been described above with reference to FIGS. 10A and 10B.

[3-3: Control of Luminance and Color of Image Based on Luminance and Color of illumination unit (FIGS. 11 to 13)]

In the basic configuration and the modification examples described above, the illumination control of the illumination unit performed based on the luminance, the meta information, or the like of an image has been described. However, the technical application range of the embodiment is not limited thereto.

For example, control of the luminance, color, or the like of an image displayed in a display region can be configured to be performed according to the luminance, color, or the like of an illumination unit that irradiates an illumination region. Hereinafter, a modification example in which image control is performed according to the illumination control will be described with reference to FIGS. 11 to 13.

Figure 11:
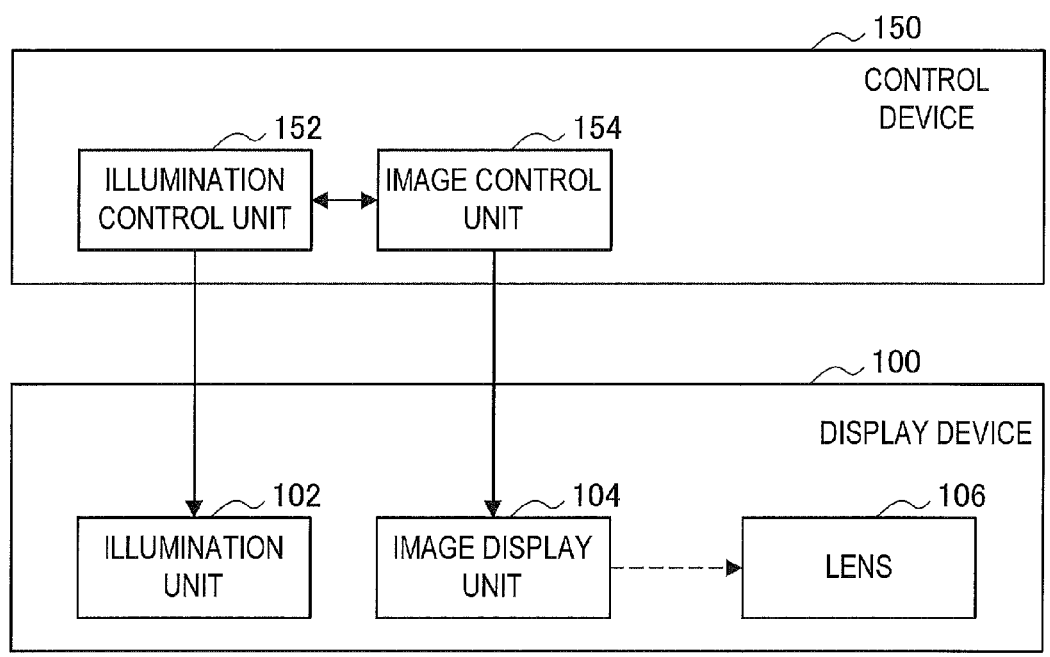
FIG. 11 is a block diagram illustrating functional configurations of a display device and a control device according to a modification example of the embodiment.

FIG. 11 is a block diagram illustrating functional configurations of a display device 100 and a control device 150 when the image control is performed according to the illumination control. In a technology according to this modification example, as illustrated in FIG. 11, a flow of information from an illumination control unit 152 to an image control unit 154 is generated in addition to the flow of information from the image control unit 154 to the illumination control unit 152. In other words, the control to be described below is performed in cooperation with the illumination control unit 152 and the image control unit 154.

The image control unit 154 predicts the luminance of an illumination region irradiated by the illumination unit 102 based on a signal from the illumination control unit 152 and adjusts the luminance of an image according to the luminance of the illumination region.

Figure 12:
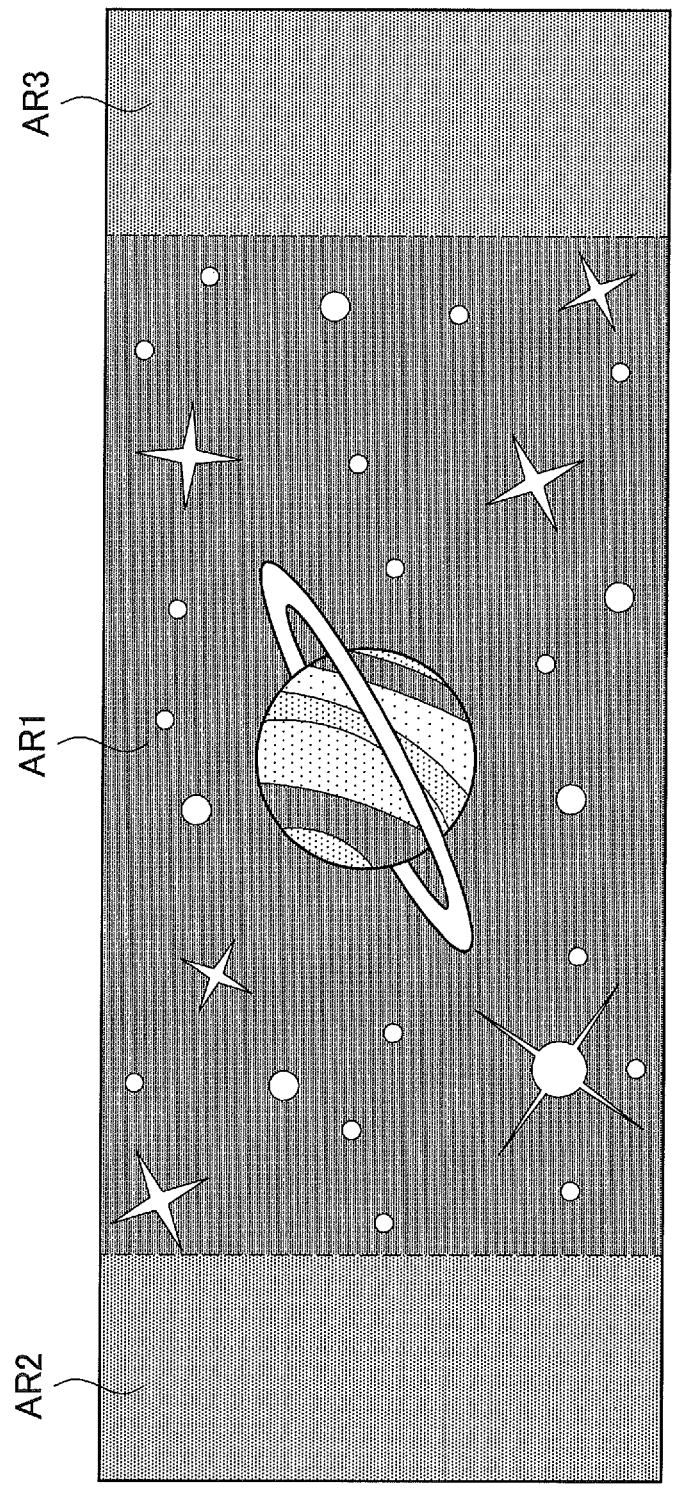
FIG. 12 is a diagram illustrating an image when image control based on the illumination control is not performed.
Figure 13:
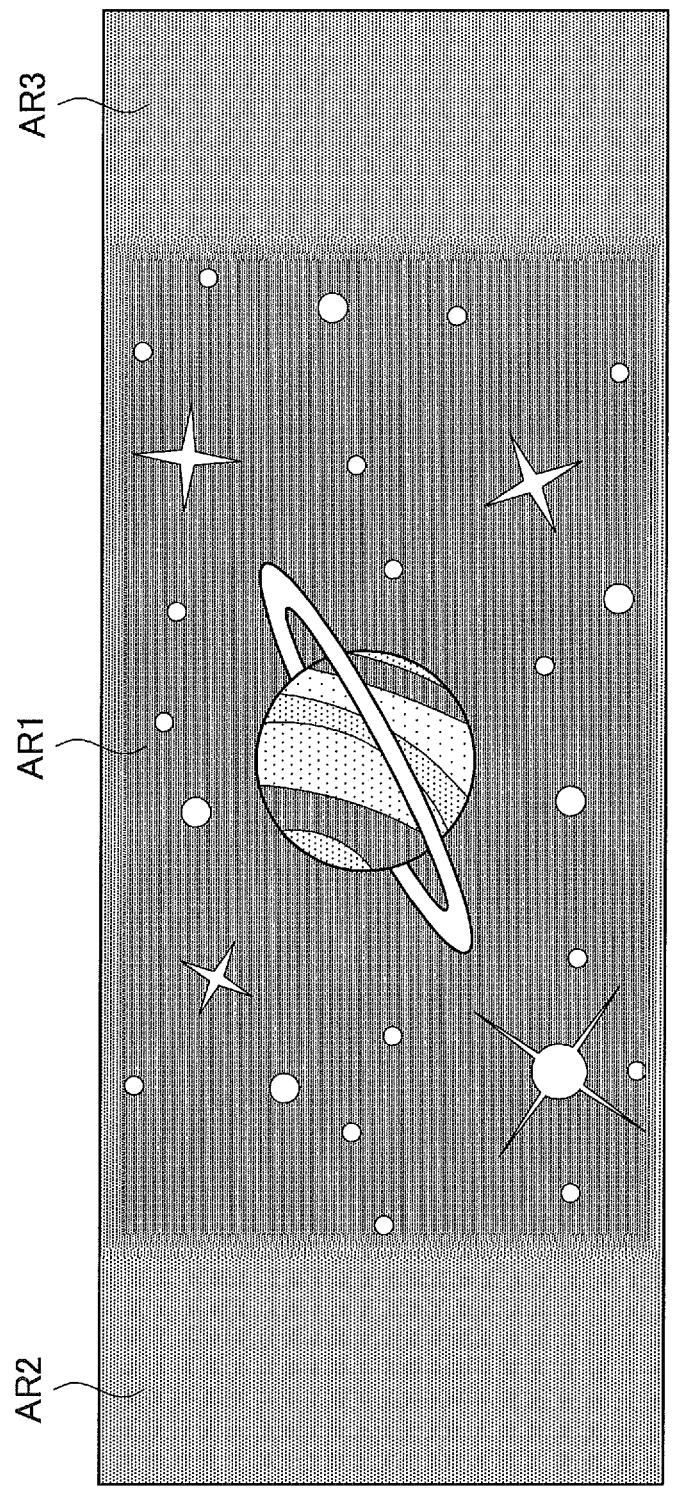
FIG. 13 is a diagram illustrating an image when the image control based on the illumination control is performed.

Here, FIG. 12 is a diagram illustrating an image when the image control based on the illumination control is not performed. FIG. 13 is a diagram illustrating an image when the image control based on the illumination control is performed.

As illustrated in FIG. 12, when the image control based on the illumination control is not performed, the luminance of illumination regions AR2 and AR3 is merely controlled according to the luminance of the display region AR1.

Conversely, when the image control based on the illumination control is performed, for example, as illustrated in FIG. 13, the image is considered to be controlled such that the luminance is continuously changed from an edge portion of the display region AR1 to an edge portion of the illumination region AR2 or an edge portion of the illumination region AR3.

By performing the image control such that the luminance is continuously changed from the edge portion of the display region AR1 to the edge portions of the illumination regions AR2 and AR3, it is possible to further reduce the fatigue on the eyes of a user.

By combining the above-described configuration with the illumination control of the illumination unit 102 performed by the illumination control unit 152, the luminance of a vicinity of the boundary between the display region and the illumination region can be changed more continuously.

The modification example in which the image control is performed according to the illumination control has been described above with reference to FIGS. 11 to 13.

[3-4: Illumination Control Based on Rhythm]

Hereinafter, a modification example in which illumination control is performed based on a rhythm will be described.

In this modification example, an illumination control unit 152 performs the illumination control of the illumination unit 102 based on a predetermined rhythm.

For example, the illumination control unit 152 performs the illumination control of the illumination unit 102 such that a temporal change of the brightness of the illumination unit 102 becomes a waveform (for example, a sinusoidal wave or a square wave) changing at a given period when the temporal change is plotted on a graph.

For example, the illumination control unit 152 may perform the illumination control of the illumination unit 102 such that the illumination control is coordinated with the rhythm of various kinds of music.

The technologies according to the modification examples of the embodiment have been described above.

[3-5: Combination Examples]

The basic configuration according to the embodiment and the modification examples have been described above. The technology according to the basic configuration may be combined with the technologies according to the modification examples. Hereinafter, combination examples of the technologies will be described.

However, the combinations of the technologies of the basic configuration and the modification examples described above are not limited to the following examples.

(3-5-1: Illumination Control Based on Image and External Environment)

For example, the illumination control unit 152 can perform the illumination control of the illumination unit 102 based on both an image displayed in a display region and an external environment.

When the illumination control is performed in consideration of two or more elements, it is necessary to determine consideration ratios of the elements.

For example, when two components of the image and the external environment are considered, as in this combination, a user may determine the consideration ratios of the image and the external environment or the illumination control unit 152 may automatically determine the consideration ratios according to the content of the image, a situation of the external environment, or the like.

For example, an example in which the user views a moving image using an HMD will be considered. For example, the illumination control unit 152 changes the consideration ratios of the image and the external environment according to the positions of reproduced portions in the entire moving image.

The illumination control unit 152 increases the consideration ratio of the external environment in regard to a start portion of the moving image and decreases a luminance difference between the external environment and the environment inside the HMD. The illumination control unit 152 gradually increases the consideration ratio of the image from the start portion to a middle portion of the moving image so that the user can be immersed in the content of the moving image. The illumination control unit 152 gradually increases the consideration ratio of the external environment from the middle portion to a final portion of the moving image and decreases the luminance difference when the user removes the HMD.

Further, information regarding the consideration ratios of the image and the external environment may be assigned as meta information to the image input to the control device 150.

The meta information may have different content depending on a kind of image, for example, whether an image is a game or a movie.

For example, when the image is a game, the consideration ratio of the external environment can be considered to increase in order to prevent the user from being immersed in the game for a long time. On the other hand, when the image is a movie, the consideration ratio of the image can be considered to increase so that the user can be further immersed in a story.

(3-5-2: Illumination Control Based on Image and Rhythm (FIGS. 14A and 14B))

For example, the illumination control unit 152 can perform the illumination control of the illumination unit 102 based on both a moving image displayed in a display region and the rhythm of music which is background music of the moving image.

For example, when an image displayed in a display region AR1 is not changed or is slightly changed from FIG. 14A to FIG. 14B, but the background music of an image illustrated in FIG. 14A is different from the background music of an image illustrated in FIG. 14B, the luminance of illumination regions AR2 and AR3 is changed.

For example, when average luminance of the moving image is changed by a value equal to or greater than a predetermined threshold value for a predetermined time, the illumination control unit 152 performs the illumination control of the illumination unit 102 based on the average luminance of the moving image. Conversely, when the average luminance of the moving image is not changed by the value equal to or greater than the predetermined threshold value for the predetermined time, the illumination control unit 152 performs the illumination control such that the luminance of the illumination unit 102 is changed with a predetermined rhythm.

When a temporal change of the average luminance of the moving image is small, as described above, the user can be considered to view the moving image without losing interest by performing the illumination control such that the luminance of the illumination unit 102 is changed with the predetermined rhythm.

4: Summarization

Finally, the technical spirit and essence of the embodiment will be simply summarized. The technical spirit and essence to be described below can be applied to a control device that controls a display device such as a non-transmissive HMD. For example, the control device described in (1) below is capable of reducing the fatigue on eyes caused due to a luminance difference between a display region and a non-display region of a display device.

Additionally, the present technology may also be configured as below.

(1) A control device including:

an illumination control unit that controls an illumination device illuminating a non-display region of a light-shielding unit that includes a display region in which an image is displayed and the non-display region in which the image is not displayed and is designed to be disposed in a region covering a visual field of a user, wherein the illumination control unit controls the illumination device according to display content of the display region.

(2) The control device according to (1), wherein the illumination control unit controls the illumination in conjunction with information on the image displayed in the display region.

(3) The control device according to (2), wherein the illumination control unit controls the illumination device based on information on pixels constituting a predetermined region of the image displayed in the display region.

(4) The control device according to (3), wherein the illumination control unit controls the illumination based on information on pixels located near a periphery of the display region among the pixels constituting the image displayed in the display region.

(5) The control device according to any one of (2) to (4), wherein the illumination control unit controls luminance of the illumination in conjunction with luminance of the image displayed in the display region.

(6) The control device according to any one of (2) to (5), wherein the illumination control unit controls a color of the illumination in conjunction with a color of the image displayed in the display region.

(7) The control device according to any one of (1) to (6), further including:

an image control unit that displays an image displayed in a region close to the non-display region in the display region in a manner that the image is gradually blurred.

(8) The control device according to (7), wherein the image control unit controls luminance of the image displayed in the display region according to luminance of the non-display region.

(9) The control device according to (2), wherein the illumination control unit controls illumination to a part of the non-display region based on information on an image displayed in a part of the display region adjacent to the part of the non-display region which is an illumination control target.

(10) The control device according to any one of (1) to (9), further including:

an environmental light detection unit that detects environmental light of an external environment exposed from a surface of the light-shielding unit located opposite a surface including the display region and the non-display region, wherein the illumination control unit controls the illumination according to the environmental light.

(11) The control device according to (10), wherein the illumination control unit controls the luminance of the illumination in conjunction with an intensity of the environmental light.

(12) The control device according to (10) or (11), wherein the illumination control unit controls a color of the illumination in conjunction with a color of the environmental light.

(13) The control device according to (1), wherein the illumination control unit changes the illumination to the non-display region based on meta information on the image displayed in the display region.

(14) The control device according to (1), wherein the illumination control unit changes the illumination according to a predetermined rhythm.

(15) A display device including:

a light-shielding unit that includes a display region in which an image is displayed and a non-display region in which the image is not displayed and is designed to be disposed in a region covering a visual field of a user;

an image display unit that displays the image in the display region;

an illumination unit that illuminates the non-display region; and an illumination control unit that controls the illumination to the non-display region located in a periphery of the display region.

(16) The display device according to (15), wherein the illumination unit is disposed in a periphery of the image display unit.

(17) A control method including:

controlling an illumination device that, according to display content of a display region, illuminates a non-display region of a light-shielding unit that includes the display region in which an image is displayed and the non-display region in which the image is not displayed and is designed to be disposed in a region covering a visual field of a user.

(18) A program for causing a computer to realize:

an illumination control function of controlling an illumination device illuminating a non-display region of a light-shielding unit that includes a display region in which an image is displayed and the non-display region in which the image is not displayed and is designed to be disposed in a region covering a visual field of a user, wherein the illumination control function controls the illumination device according to display content of the display region.

(19) An illumination control method including:

controlling illumination to a non-display region located in a periphery of a display region according to information on an image displayed in the display region when the non-display region is illuminated by displaying the image in the display region in a light-shielding unit that includes the display region in which the image is displayed and the non-display region in which the image is not displayed and is designed to be disposed in a region covering a visual field of a user.

(20) A program for causing a computer to realize:

an image display function of displaying an image in a display region in a light-shielding unit that includes the display region in which the image is displayed and a non-display region in which the image is not displayed and is designed to be disposed in a region covering a visual field of a user; and an illumination control function of controlling the illumination to the non-display region located in a periphery of the display region by controlling an illumination unit illuminating the non-display region.

The preferred embodiments of the present disclosure have been described in detail above with reference to the appended drawings, but the technical range of the present disclosure is not limited thereto. It should be apparent to those skilled in the art that various modification examples or correction examples can be made within the range of the technical spirit and essence described in the claims and, of course, pertain to the technical range of the present disclosure.

The present disclosure contains subject matter related to that disclosed in Japanese Priority Patent Application JP 2012-134678 filed in the Japan Patent Office on Jun. 14, 2012, the entire content of which is hereby incorporated by reference.

What is claimed is:

1. A control device, comprising:
an illumination control unit configured to:
control an illumination device that illuminates a non-display region of a light-shielding unit that includes:
a display region in which a moving image is displayed; and
the non-display region in which display of the moving image is prevented,
wherein the light-shielding unit is designed to be disposed in a region that covers a visual field of a user; and
control the illumination device according to a ratio, of a component of external environment to a component of the displayed moving image, wherein the ratio changes according to a position of the moving image.

2. The control device according to claim 1, wherein the illumination control unit is further configured to control the illumination device based on information on pixels that constitutes a determined region of the moving image displayed in the display region.

3. The control device according to claim 1, wherein the illumination control unit is further configured to control the illumination based on information on pixels located near a periphery of the display region among pixels that constitutes the moving image displayed in the display region.

4. The control device according to claim 1, wherein the illumination control unit is further configured to control luminance of the illumination in conjunction with luminance of the moving image displayed in the display region.

5. The control device according to claim 1, wherein the illumination control unit is further configured to control color of the illumination in conjunction with color of the moving image displayed in the display region.

6. The control device according to claim 1, further comprising an image control unit configured to display the moving image in a region of the display region close to the non-display region in a manner that the moving image is gradually blurred.

7. The control device according to claim 6, wherein the image control unit is further configured to control luminance of the moving image displayed in the display region according to luminance of the non-display region.

8. The control device according to claim 1, wherein the illumination control unit is further configured to control illumination of a part of the non-display region based on information on the moving image displayed in a part of the display region adjacent to the part of the non-display region which is an illumination control target.

9. The control device according to claim 1, further comprising an environmental light detection unit configured to detect environmental light of an external environment exposed from a surface of the light-shielding unit, wherein the environmental light detection unit is located opposite a surface that includes the display region and the non-display region, and wherein the illumination control unit is further configured to control the illumination according to the environmental light.

10. The control device according to claim 9, wherein the illumination control unit is further configured to control luminance of the illumination in conjunction with an intensity of the environmental light.

11. The control device according to claim 9, wherein the illumination control unit is further configured to control color of the illumination in conjunction with color of the environmental light.

12. The control device according to claim 1, wherein the illumination control unit is further configured to change the illumination according to a determined rhythm.

13. The control device according to claim 1, wherein the illumination control unit is further configured to control the illumination of the illumination device in conjunction with temperature or humidity of external environment.

14. The control device according to claim 1, wherein the ratio decreases from a start of the moving image to a determined position of the moving image.

15. A display device, comprising:
a light-shielding unit that includes a display region in which a moving image is displayed and a non-display region in which display of the moving image is prevented, wherein the light-shielding unit is designed to be disposed in a region that covers a visual field of a user;
an image display unit configured to display the moving image in the display region;
an illumination unit configured to illuminate the non-display region; and
an illumination control unit configured to control the illumination of the non-display region located in a periphery of the display region,
wherein the illumination of the non-display region is controlled based on a ratio, of a component of external environment to a component of the displayed moving image, wherein the ratio changes according to a position of the moving image.

16. The display device according to claim 15, wherein the illumination unit is disposed in a periphery of the image display unit.

17. A control method, comprising:
controlling an illumination device configured, according to a ratio of a component of external environment to a component of a moving image, to illuminate a non-display region of a light-shielding unit that includes a display region in which the moving image is displayed and the non-display region in which display of the moving image is prevented, wherein the light-shielding unit is designed to be disposed in a region covering a visual field of a user, and wherein the ratio changes according to a position of the moving image.

18. A non-transitory computer-readable storage medium, having stored thereon a set of instructions for a computer to execute operations, comprising:
controlling an illumination device illuminating a non-display region of a light-shielding unit that includes a display region in which a moving image is displayed and the non-display region in which display of the moving image is prevented, wherein the light-shielding unit is designed to be disposed in a region covering a visual field of a user,
wherein the illumination control function is configured to control the illumination device according to a ratio, of a component of external environment to a component of the displayed moving image, wherein the ratio changes according to a position of the moving image.

19. An illumination control method, comprising:
controlling illumination of a non-display region located in a periphery of a display region according to a ratio of a component of external environment to a component of a moving image displayed in the display region in a light-shielding unit that includes the display region in which the moving image is displayed and the non-display region in which display of the moving image is prevented, wherein the light-shielding unit is designed to be disposed in a region covering a visual field of a user, and
wherein the ratio changes according to a position of the moving image.

20. A non-transitory computer-readable storage medium, having stored thereon a set of instructions for a computer to execute operations, comprising:
displaying a moving image in a display region in a light-shielding unit that includes the display region in which the moving image is displayed and a non-display region in which display of the moving image is prevented, wherein the light-shielding unit is designed to be disposed in a region covering a visual field of a user; and
controlling illumination of the non-display region located in a periphery of the display region by controlling an illumination unit illuminating the non-display region,
wherein the illumination of the non-display region is controlled according to a ratio, of a component of external environment to a component of the displayed moving image, wherein the ratio changes according to a position of the moving image.

* * * * *